Dec. 22, 1964   C. W. MUSSER   3,162,041
TORQUE INDICATOR
Filed June 5, 1962   5 Sheets-Sheet 1

Inventor
C. Walton Musser
By his Attorney

Dec. 22, 1964
C. W. MUSSER
3,162,041
TORQUE INDICATOR
Filed June 5, 1962
5 Sheets-Sheet 4
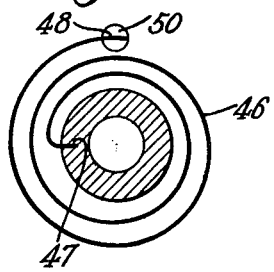
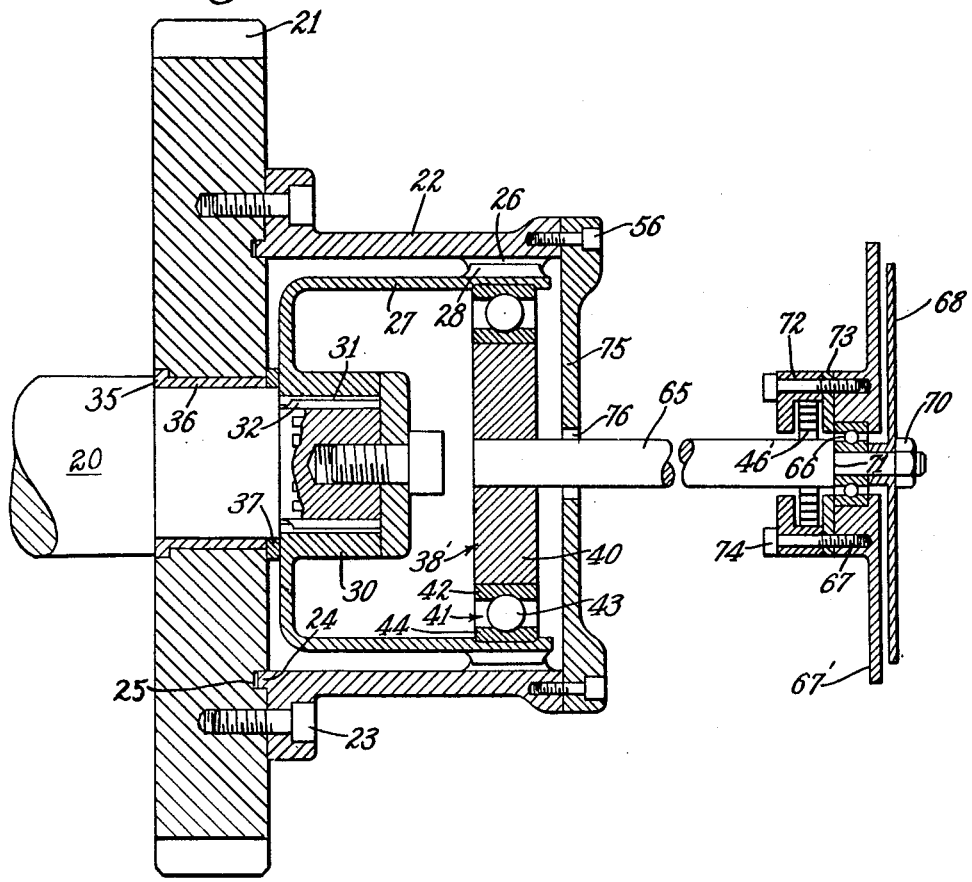

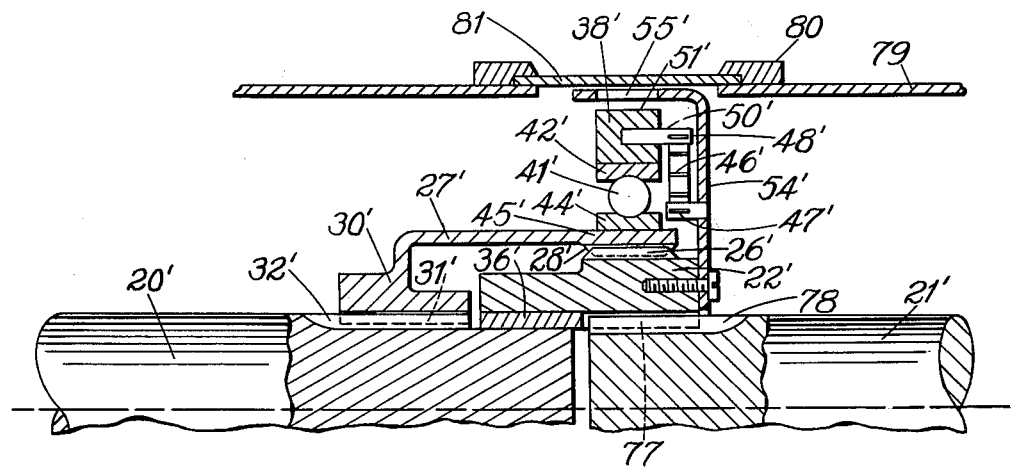

United States Patent Office 3,162,041
Patented Dec. 22, 1964

3,162,041
TORQUE INDICATOR
C Walton Musser, Palos Verdes Estates, Calif., assignor to United Shoe Machinery Corporation, Boston, Mass., a corporation of New Jersey
Filed June 5, 1962, Ser. No. 200,281
15 Claims. (Cl. 73—136)

The present invention relates to torque indicators which constantly show the amount of torque being transmitted to an output element such as a gear.

A purpose of the invention is to interpose a harmonic drive between the input and the output, connecting one of the input and the output to a circular spline of the harmonic drive and the other of the input and the output to a flexspline of the harmonic drive, with a wave generator acting to deflect the flexspline, and to resiliently bias the wave generator in one rotative direction and indicate rotation of the wave generator.

A further purpose is to resiliently bias the wave generator by means, suitably a torsion spring, acting from the one of the flexspline and the circular spline which is connected to the output.

A further purpose is to have the means for resiliently biasing the wave generator act from a fixed position.

A further purpose is to have a torsion spring, acting from a fixed point resiliently bias the wave generator in a torque indicator.

A further purpose is to indicate the relative rotation of the wave generator by color indicating means responsive to the rotation of the wave generator, the means suitably consisting of an indicator disc having areas of different colors at different angular positions and shutter means operatively positioned with respect to the indicator disc to mask at least the area of one but not all of the total number of colors.

A further purpose is to indicate the rotation of the wave generator by an indicator disc having a spiral mark which turns with the wave generator, operating in cooperation with a plurality of concentric reading rings one of which at a certain radial distance from the axis will coincide with a point on said spiral.

A further purpose is to provide a circular spline having a set of internal teeth arranged in a circular configuration, a flexspline having a set of external teeth which mesh and contact with the teeth on the circular spline at a plurality of circumferentially spaced points with intermediate points at which the teeth on the flexspline are out of mesh and out of contact with the teeth on the circular spline, the flexspline being inside the circular spline, and with a wave generator within the flexspline and deflecting it into mesh and contact with the circular spline at said points of mesh and contact, the number of teeth on the circular spline being greater and different from the number on the flexspline by the number of such points of mesh and contact or a multiple thereof, to connect input means to the flexspline, to connect output means to the circular spline, and to provide means for resiliently biasing the wave generator in one rotative direction and for indicating rotation of the wave generator.

A further purpose is to resiliently bias the wave generator by a torsion spring acting from the circular spline or the flexspline.

Further purposes appear in the specification and in the claims.

FIGURE 3a is a view corresponding to FIGURE 3 taken along the line III—III of FIGURE 1, showing the alternative indicating device of FIGURE 2a.

FIGURE 4 is a fragmentary cross sectional view on the line IV—IV of FIGURE 1.

FIGURE 5 is a longitudinal cross section similar to FIGURE 1 but showing an alternate means providing for remote indication.

FIGURE 6 is an axial section of an inverse form of the invention, i.e., the wave generator is external to the flexspring, rather than internal.

Figure 1:
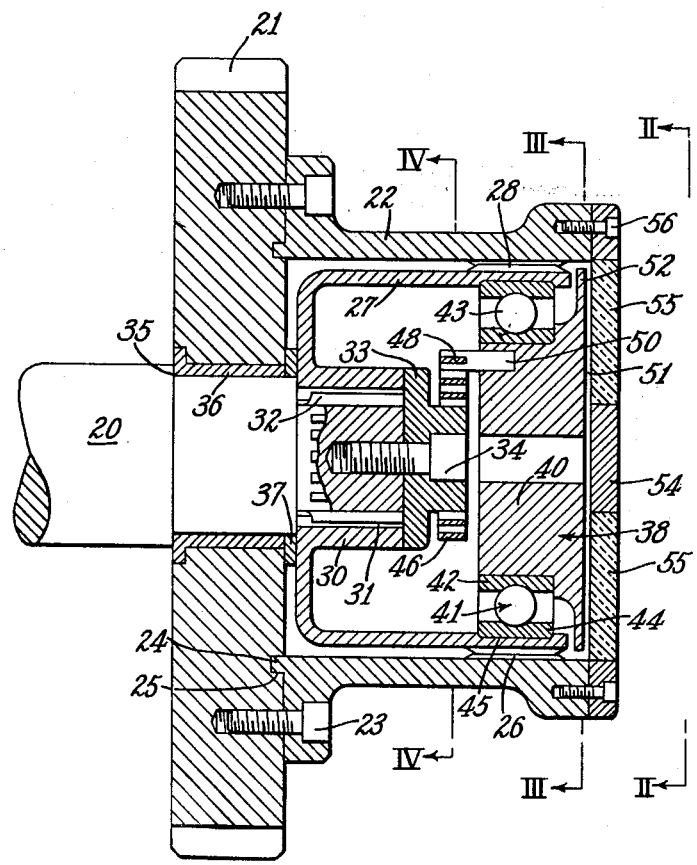
FIGURE 1 is a cross sectional view of the preferred embodiment of the device of the invention, the section being taken on the longitudinal axis.

In many cases it is desirable to know the amount of torque which is being transmitted by a machine or other equipment. One purpose may be to prevent overstressing a machine element. Another purpose may be to obtain a constant indication of the torque for some operation or process which is sensitive to the amount of torque.

In prior practice, it has been usual to use equipment such as strain gauges to determine the amount of torque being transmitted. This and similar equipment have proved to be excellent for laboratory purposes, but they are somewhat expensive, complicated and very sensitive so that they are not desirable for continuous production processes. Such devices also generally require the use of slip rings to make electrical connection to rotating parts, and these are likely to be a source of trouble.

The device of the invention provides an input shaft which functions as the driver and an output machine element, in this case a gear, which is splined to the input shaft through a harmonic drive rotary-to-rotary reduction unit.

Considering first the form of FIGURES 1, 2, 3 and 4, an input shaft 20 drives a coaxial output gear 21. The output gear 21 is connected to the input shaft 20 through a harmonic drive mechanism to be described. A housing 22 of the harmonic drive unit is fastened to the output gear 21 by cap screws 23. An end flange 24 on the housing desirably also enters an annular concentric groove 25 in the side of the gear. On the inside the housing 22 has internal circular spline teeth 26 which are concentric and evenly spaced and form the circular spline of the harmonic drive.

A flexspline 27 has external teeth 28 which cooperate with the internal teeth 26 on the circular spline in the manner well known in harmonic drive as described for example in my United States Patents 2,906,143 issued September 29, 1959 for Strain Wave Gearing; 2,929,265 issued March 29, 1960 for Strain Wave Gearing—Multiple Tooth Differences; 2,929,266 issued March 22, 1960 for Strain Wave Gearing—Tubular Shaft; 2,931,248 issued April 5, 1960 for Strain Wave Gearing—Strain Inducer Species; 2,932,986 issued April 19, 1960 for Strain Wave Gear Species in Which Only One of the Gears is Input; 2,943,513 issued July 5, 1960 for Dual Strain Wave Gearing; and 2,959,065 issued November 8, 1960 for Spline and Rotary Table. The internal and external teeth have the same tooth form and the flexspline teeth at the major axis or points of deflection corresponding to the lobes of the harmonic drive are in contact and in mesh with the circular spline, while at circumferentially spaced intermediate points the teeth on the flexspline are out of contact and out of mesh.

The flexspline 27 is provided with an integral hub 30 which has internal spline teeth 31 and these teeth are splined and engaged with concentric external spline teeth 32 which are on an extension at the end of the input shaft 20. The flexspline hub 30 is held on the end of the input shaft 20 by the cap 33 and the cap screw 34 threaded into the end of the shaft 20.

Interposed between a reduced portion of the shaft 20 and the output gear 21 is a concentric bearing 36 which journals gear 31. A thrust washer 37 on the shaft 20 between the gear and the flexspline serves to hold the gear and the bearing 36 in axial relation to a shoulder 35 of the shaft. This output gear 21 is accordingly permitted to rotate through a small number of degrees in relation to the input shaft 20 so as to cause a wave generator 38 to rotate to a relative angular position dependent as later explained upon the amount of torque on the input shaft 20. In effect, therefore, the output gear 21 is connected to and splined to the shaft 20 by the circular spline cooperating with the flexspline.

The function of the wave generator is in many respects that disclosed in the patents cited and commonly performed by wave generators in harmonic drive mechanisms. Thus where, as in the specific device of Figs. 1 and 5 the circular spline surrounds the flexispline, the wave generator will be inside the flexspline, whereas in the reversal form of Fig. 6 where the flexspline surrounds the circular spline, the wave generator will externally surround the flexspline.

It is important that the wave generator deflect the flexspline into engagement and mesh with the teeth on the circular spline at the major axis and out of engagement and mesh at the minor axis of the elliptoid, where an elliptoidal form is under consideration, or at the lobe where some other form such as a three lobe form is being used. In order to effect proper spline or tooth engagement, therefore, the same tooth form should be used on the circular spline and on the flexspline.

For proper operation the difference in the number of teeth between the larger member, in this case (FIGS. 1 and 5) on the circular spline, and the smaller member, in this case on the flexspline, should be equal to the number of lobes on the wave generator, in the case of the present embodiment two, or a multiple thereof.

For convenience the wave generator 38 in the present case may be assumed to be elliptodial. The wave generator has elliptodial plug or wave generator cam 40 shown in Figure 1 sectioned at the major axis. The elliptodial plug or cam 40 is surrounded by a wave generator bearing 41 composed of an inner elliptoidal bearing race 42, circular ball or roller members 43, in this case balls, and an outer elliptoidal bearing race 44 which suitably makes a press fit inside the flexspline. This type of interconnection is suitable in a small wave generator. Of course as the inner race of the initially circular bearing is pushed onto the wave generator cam 40, the cam 40 causes the inner race 42 to become elliptoidal and this causes the outer race 44 to become elliptoidal and this in turn causes the flexspline to become elliptoidal and bring about intimate engagement of the flexspline teeth 28 and the circular spline teeth 26 surrounding them. The outer race 44 of the wave generator bearing is snapped into a shallow groove 45 in the flexspline.

The angular relationship of the wave generator 38 and the input shaft 20 is determined during operation as an indication of torque being transmitted, the wave generator 38 being connected to the input shaft through a torision spring 46 anchored at one end at 47, suitably the inner end, to the cap 33 secured to the input shaft and at the other end 49 to a spring abutment 50 secured and protruding from the wave generator cam 40 as best seen in Figures 1 and 4.

It will be evident that when the input shaft 20 is rotated, the wave generator is rotating at the same speed as the input shaft, providing the output is not absorbing substantial torque. However, when the torque demand of the output 21 rises to a substantial value, the harmonic drive unit functions as a speed increaser and hence tends to rotate or drive the wave generator 38. This tends to wind up the torsion spring 46 and causes an angular motion to take place between the wave generator 38 and the input shaft 20. Of course by proper selection of the torsion spring rate, the relative angular motion of the wave generator for a given torque can be made to assume any value desired.

However, in order to simplify the device of Figure 1 and for the purpose of illustration it is assumed that the relative angular displacement of the wave generator will be less than 90°. Thus with this device when the largest amount of torque for which it is designed is being transmitted to the output gear 21, the wave generator 38 will be angularly displaced in relation to the input shaft through an angular distance less than 90°.

Figure 2:
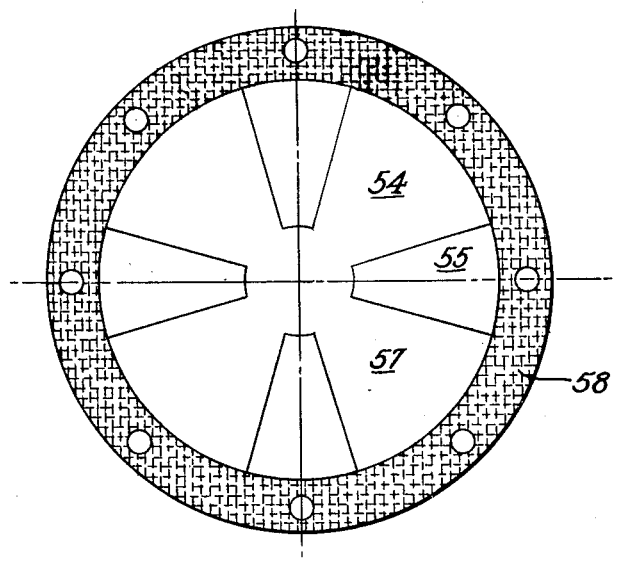
FIGURE 2 is an end view of FIGURE 1 taken along the line II—II.
Figure 3:
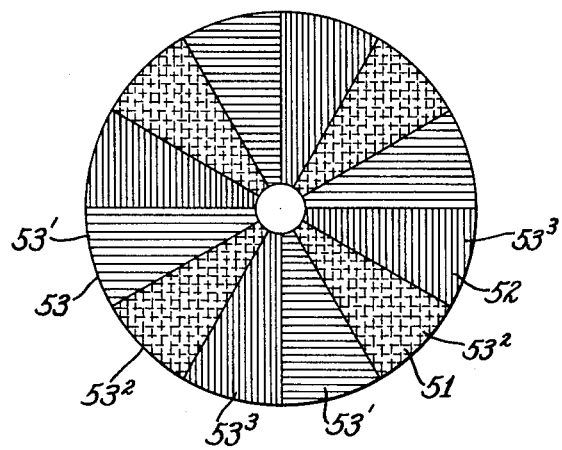
FIGURE 3 is a partial cross sectional view of FIGURE 1 taken along the line III—III.

On the end of the wave generator 38 there is a flat surface 51 which is desirably extended radially by providing a flange 52. In this specific embodiment of the device as shown in FIGURES 2 and 3, the target area of an indicator is divided into segments 53 which are repeated in each of the four quadrants and colored in sequence with contrasting colors, preferably the three primary colors, and thus designated $53^1$, $53^2$ and $53^3$, is illustrated in FIGURE 3. It will be evident that in FIGURE 3 this has been accomplished by dividing the face 51 into twelve pie-shaped segments. For convenience, it will be assumed that segments $53^1$ are colored red, segments $53^2$ are colored yellow and segments $53^3$ are colored blue. The indications are determined by a shutter plate 54, as best shown in FIGURES 1 and 2, which is in effect a cover to mask certain areas of the colored surface 51 and expose other corresponding areas in unison. The shutter is an opaque cover with the exception of four transparent windows 55 which are spaced in quadrature and of segmental form corresponding to the indicator segments. This is conveniently accomplished by making the shutter of a transparent plastic and covering it with an opaque material 57 at all places where the windows are not desired. The cover is conveniently mounted on the end of the housing 22 by cap screws 56.

In operation, let us assume for the purpose of discussion that the shutter plate 54 is oriented in relation to the wave generator 38 so that the blue segments $53^3$ will show through the windows 55 when no substantial torque is being transmitted by the device. Under these conditions if the input shaft 20 is rapidly rotating, the persistence of vision of the human eye will make the shutter plate 54 look blue. To assist this optical illusion it is desirable to have the opaque portion 57 of the shutter plate colored white as this will tend to accentuate the blue color. Hence, it is possible to determine at a glance at the shutter plate and indicator disc whether the device is indicating that no torque is being transmitted, since if it is it will appear to be blue.

Now let us assume that the direction of rotation of the output and input is such that if the torque were applied it would tend to rotate the wave generator 38 in such a manner as to cause the yellow segments $53^2$ to show through the shutter plate windows 55. Now if torque were applied, the blue would be moving out of the shutter plate windows and the yellow would be entering the shutter plate windows. Accordingly, when no torque at all is being put out by the device, the end of the shutter plate cover 54 will appear blue and as torque is applied it will seem to change its color with the amount of torque, having progressively more yellow mixed with blue, or that is various shades of green, until eventually it becomes pure yellow when the indicator segments $53^2$ completely occupy the shutter plate windows 55.

Now the next set of indicator plate segments in the order of higher torque level are red. As the red enters the windows 55, the persistence of vision of the human eye will tend to blend it with the yellow and produce orange, until the maximum amount of red enters the windows when the indicator disc will appear to be pure red. The next step in higher torque level will bring some of the blue into the window and mix it with the red, producing purple. The device preferably should not function at a level high enough to bring pure blue into the windows again, as it would not be possible to distinguish this indication from an indication of no torque.

Accordingly in operation of the device it will be evident that the amount of torque that is being transmitted from the input shaft 20 to the output gear 21 determines the color visible on the shutter plate, varying from blue to purple through all the shades.

This is a most sensitive means of gauging the amount of torque at a glance.

Thus it will be evident that the rim 58 of the shutter plate could be the same color as the color which will be produced by the desired level of torque and a man's capability of measuring torque precisely to a reasonable degree can be developed by comparison methods. This enables the observer to see at a glance whether the torque is at the desired level or above or below.

If a lesser degree of control is necessary, it would be desirable to operate or intend to operate in the yellow range. Then as the yellow became tinged with red and began to appear orange, a danger condition from the standpoint of high torque would be approaching. This visual system has the advantage that it follows the sequence of green, yellow and red widely used in traffic lights, and reserves the red as a danger signal. In this case blue would correspond to no torque, green would be a small amount of torque, yellow would be a larger and cautionary amount of torque, and red would mean that the torque level desired has been exceeded by the device. In this case purple would be reserved for a real emergency.

Figure 2A:
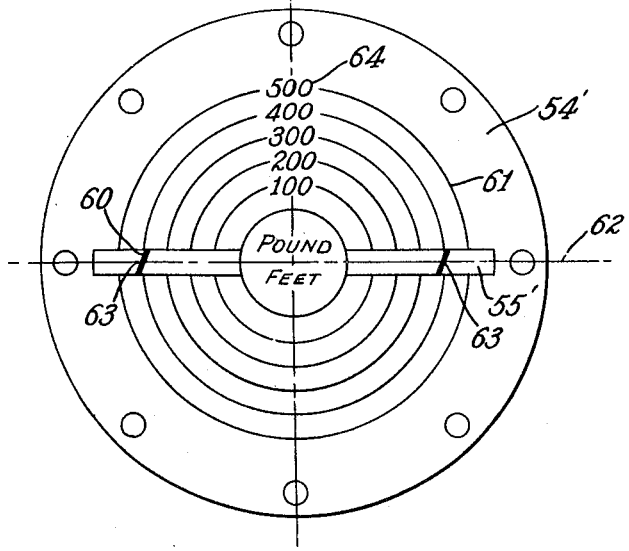
FIGURE 2a is a view similar to FIGURE 2 taken along the line II—II of FIGURE 1, showing an alternative indicating device.
Figure 3A:
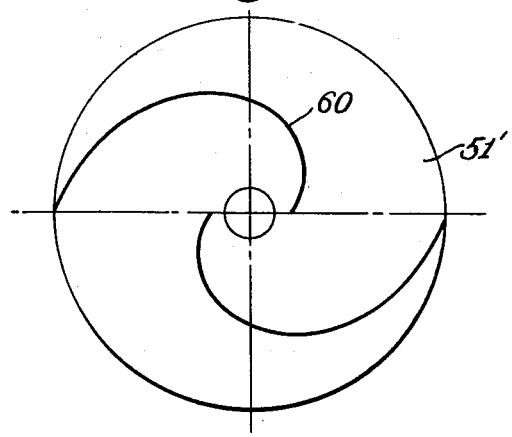

The device is capable of indication by means other than color, the same principle being used, but with a different form of indication device as shown in FIGURES 2a and 3a. This is conveniently accomplished by marking the indicator end 51' on the wave generator with spirals 60 which may conveniently be laid out as shown, one starting at a point remote from the radial origin in the first quadrant and extending radially outward and terminating at the radial perimeter in the second quadrant, and the other being an opposite counterpart starting in the third quadrant and terminating at the radial outer perimeter in the fourth quadrant. The lobes are symmetrical. This indicator disc of FIGURE 3a is used behind a cover plate 54' which has a series of concentric circles 61 having progressively greater diameters and a radial reading window 55' which in this case is at the X axis 62 and shows through on the opposite sides coincidence points 63 at which the spirals intersect the X axis. The rings can be graduated in any suitable units such as foot pounds or inch pounds as shown by the figures at 64.

In operation then this device will show through the window 55' two spirals 60 which can be painted on the face of the indicator disc 51' which is viewed by the user. Thus the device can be read by the location of the spirals 60 at the X axis 62 which will demonstrate the torque level. Since the rings 64 are arranged in circles around the center they can be read while the shaft is rotating, and if the spiral 60 is of different color than the background, the location of the point at which it crosses the transparent window 55' will demonstrate the torque level notwithstanding the rotation. It is evident therefore that the actual indication means can take one of several different forms notwithstanding that the principle of the spiral spring interconnecting the input means and the wave generator 38 is used and also where the window is located on and turns with the output as in the devices thus far described. The wave generator then functions as the indicator.

It will be evident that the device of the invention has very great advantages since both torque transmitted and a change in torque delivered to the output gear 21 is rotatively effective upon the torsion spring, but it is not necessary to use a spring of great size which might be difficult to manufacture with instrument precision, and the amount of softness or lack of rigidity in the drive is reduced to a minimum by the present invention.

For example, assume that the harmonic drive in the illustration has a gear ratio as a speed reducer of 360:1, and that the wave generator 38 for the full torque range provided goes through an angle of 90 degrees. For one rotation of the input shaft 20 the wave generator would then rotate one-quarter of a revolution. Since there are 360 degrees in a circle and the gear reduction has a gear ratio of 360:1, a 90 degree rotation of the wave generator 38 would produce one-quarter of a degree rotation of the output gear 21 in relation to the input shaft 20. From this it can be seen that if the gear ratio were 90:1, a revolution of the wave generator 38 of 90 degrees would permit the output gear 21 to rotate one degree in relation to the input shaft 20. It will thus be evident that there is a minuscule movement of the output member in relation to the driving or input member and the two elements are basically always tightly splined together.

An important aspect is that the rotational moment of inertia of the wave generator 38 is of such a nature as to effectively damp out shock loads such as would be occasioned by gear teeth.

In the above analysis the wave generator 38 was assumed fundamentally to rotate through the same number of revolutions as the input shaft 20, assuming no change in delivered torque. In operating in this manner, the flexspline and the circular spline for a given torque level remain splined together in one relative angular position with respect to one another. However, in some instances it may be desirable to read the torque at some distance from the end of the input shaft and in such a case it is desirable to extend the reading mechanism away from the end of the input shaft. FIGURE 5 illustrates a device of this character. The wave generator 38' has secured therein coaxially with the input shaft and the wave generator, as by a press fit, an extension or indicator shaft 65. The indicator shaft 65 is journalled at its inner end by the harmonic drive 38' and is journalled at the outer end suitably by an antifriction bearing 66 held by a housing 67 which is suitably stationary. The indicator shaft at its remote end carries a dial indicator 68 held on the end of the indicator shaft by a nut 70 which also retains the inner race of the bearing 66 against the shaft shoulder 71.

In the device of FIGURE 5 a torque spring 46' is anchored at the inside to shaft 65 and anchored at the outside against housing 67 by a flanged ring 72 and bearing retaining spacer 73 secured to the housing 67 by cap screws 74. The harmonic drive itself is protected against dust by a cover 75 secured by cap screws 56 in the end of the circular spline housing 22, the cover having a suitable central opening 76 to pass indicator shaft 65 and which may be sealed to it in any suitable manner as by an oil seal, not shown, if desired.

It will be noted that in the form of FIGURE 5 there is no torsion spring operating between the input shaft and the wave generator as in the other forms, but the wave generator 38' is biased against rotation from a fixed point by torsion spring 46'. Unless there is motion caused by output torque the wave generator 38' in FIGURE 5 is effectively stationary as far as rotation is concerned. This does not prevent it, however, from intersplining the flexspline and the circular spline. Therefore, in the form of FIGURE 5 the output gear 21 will not rotate at identically the same speed as the input shaft but will be rotating at slightly faster or slightly slower speeds depending upon the arrangement of the harmonic drive. For the specific form shown in FIGURE 5, the output gear 21 is rotating at a slightly slower speed than the input shaft 20. Assuming that the gear reduction is 100:1, the output gear makes 99 rotations while the input shaft 20 makes 100 rotations.

However, in FIGURE 5 the harmonic drive is functioning as a gear reduction unit, and it can also function as a speed increaser. As torque is applied to the output gear 21 it causes the wave generator 38' to have a torque placed upon it which will wind up the torsion spring 46' and cause the hand 68 to read the output torque on the dial 67'. It will therefore be evident that the output of torque indicated will be strictly a function of the output of torque being supplied to the output gear 21 by the input shaft 20.

In the form of FIGURE 6, input shaft 20' having spline teeth 32' connects to interior spline teeth 31' on hub 30' of flexspline 27' which has interior flexspline teeth 28'. The flexspline teeth engage and mesh at spaced points with outer circular spline teeth 26', while at intermittent points they are out of engagement and out of mesh. The teeth 26' are mounted on housing 22'. Wave generator 38' deflects innerrace 42' confining bearing balls 41' interiorly following race 44' which conforms to the outside of flexspline 45'. The housing 22' has interior spline teeth 77' which engage exterior spline teeth 78' on output shaft 21'. The housing 22' rides on a concentric bearing 36' on the end of input shaft 20'. Fastened to the housing 22' is a shutter plate cover 54' which mounts a torsion spring 46' at one end 47', the other end being connected to the wave generator 38' at 48' by spring abutment 50'. A surrounding casing 79 mounts a transparent window 81 by a bezel 80. Torque transmitted is read by looking through window 81 and through opening 55' in shutter plate 54' to view a suitable indicator on outer surface 51' of the wave generator.

It will be evident that the device of the invention may be employed as a component of other pieces of equipment where torque is to be indicated or measured, such as torque wrenches and other devices for regulating the range of internal stress in bolts and other component parts of machinery.

In view of my invention and disclosure variations and modifications to meet individual whim or particular need will doubtless become evident to others skilled in the art, to obtain all or part of the benefits of my invention without copying the structure shown, and I therefore claim all such insofar as they fall within the reasonable spirit and scope of my claim.

Having thus described my invention what I claim as new and desire to secure by Letters Patent is:

1. In a torque indicator, a circular spline having a set of teeth arranged in a circular configuration, a flexspline having a set of teeth which mesh and contact with the teeth on the circular spline at a plurality of circumferentially spaced points with intermediate points at which the teeth on the flexspline are out of mesh and out of contact with the teeth on the circular spline, the circular spline and the flexspline being concentric members one within another and one having external teeth and the other having internal teeth, a concentric wave generator on the side of the flexspline remote from the circular spline, having lobes which deflect the flexspline into mesh and contact with the circular spline at points of mesh and contact, with intervening points at which the teeth are out of mesh, the difference in the number of teeth between the outer member and the inner member equalling the number of lobes on the wave generator or a multiple thereof, rotary means for applying input torque to one of the flexspline and the circular spline, rotary means for connecting output to the other of the flexspline and the circular spline, means for resiliently biasing the wave generator in one rotative direction, and means for indicating rotation of the wave generator as a measure of the torque delivered.

2. A torque indicator of claim 1, in which the means for resiliently biasing the wave generator comprises means acting from said input applying means.

3. A torque indicator of claim 1, in which the means for resiliently biasing the wave generator comprises a torsion spring acting from said input applying means.

4. A torque indicator of claim 1, in which the means for resiliently biasing the wave generator comprises means acting from a fixed position.

5. A torque indicator of claim 1, in which the means for resiliently biasing the wave generator comprises a torsion spring acting from a fixed point.

6. A torque indicator of claim 1, in which the means for indicating rotation of the wave generator comprises color indicating means responsive to the rotation of the wave generator.

7. A torque indicator of claim 1, in which the means for indicating the rotation of the wave generator comprises an indicator disc having areas of different colors at different angular positions rotating with the wave generator, and shutter means operatively positioned with respect to the indicator disc to mask the equivalent of all of said areas except those having one color.

8. A torque indicator of claim 7, further characterized in that the shutter means is mounted for rotation with the output member and is provided with an area of reference color showing on the shutter means and available for comparison with the color indicated by visual persistence when viewing the disc through windows of the shutter.

9. A torque indicator of claim 8, in which the reference color comprises a white outer band on the shutter means.

10. A torque indicator of claim 1, in which the means for indicating the rotation of the wave generator comprises an indicator disc having a spiral marking which turns with the wave generator, said spiral extending outwardly from its radial origin in one quadrant of the disc toward the perimeter of an adajcent quadrant of the disc, and a plate mounted in substantially parallel relation to the disc and bearing a plurality of rotatable concentric reading rings concentric with the disc and which at a certain axis coincide with a point on said spiral, the rings having diameters less than that of the disc.

11. In a torque indicator, a circular spline having a set of internal teeth arranged in a circular configuration, a concentric flexspline having a set of external teeth which mesh and contact with the teeth on the circular spline are out of mesh and out of contact with the teeth with intermediate points at which the teeth on the flexspline are out of mesh and out of contact wtih the teeth on the circular spline, the flexspline being inside the circular spline, a concentric wave generator within the flexspline having lobes which deflect it into points of mesh and contact with the circular spline at said points of mesh and contact, the difference in the number of teeth on the circular spline and on the flexspline being equal to or a multiple of the number of lobes on the wave generator, rotary input means connected to the flexspline, rotary output means connected to the circular spline, means for resiliently biasing the wave generator in one rotative direction, and means for indicating rotation of the wave generator.

12. A torque indicator of claim 1, in which the means for resiliently biasing the wave generator comprises means acting from a fixed position.

13. A torque indicator of claim 11, in which the means for resiliently biasing the wave generator comprises a torsion spring acting from a fixed point.

14. A torque indicator of claim 11, in which the means for indicating rotation of the wave generator comprises color indicating means responsive to the rotation of the wave generator.

15. A torque indicator of claim 11, in which the means for indicating the rotation of the wave generator comprises an indicator disc having areas of different colors at different angular positions rotating with the wave generator, and shutter means mounted on the output means operatively positioned with respect to the indicator disc to mask the areas equivalent to those of at least one color, but less than all the colors, whereby visual persistence on viewing the disc through windows of the shutter signals the degree of torque being transmitted.

References Cited in the file of this patent

UNITED STATES PATENTS

| | | |
|---|---|---|
| 1,532,548 | Ramsey | Apr. 7, 1925 |
| 2,088,326 | Klopfer | July 27, 1937 |
| 2,191,045 | Slayton | Feb. 20, 1940 |
| 2,811,853 | Friedman | Nov. 5, 1957 |
| 2,932,986 | Musser | Apr. 19, 1960 |
| 3,038,438 | Taylor et al. | June 12, 1962 |

UNITED STATES PATENT OFFICE

CERTIFICATE OF CORRECTION

Patent No. 3,162,041                  December 22, 1964

C Walton Musser

It is hereby certified that error appears in the above numbered patent requiring correction and that the said Letters Patent should read as corrected below.

Column 3, line 17, for "31" read -- 21 --; line 32, for "flexispline" read -- flexspline --; lines 53, 54 and 56, for "elliptodial", each occurrence, read -- elliptoidal --; same column 3, line 75, for "torision" read -- torsion --; column 4, line 2, for "49" read -- 48 --; column 6, line 64, for "torque" read -- torsion --; column 8, line 48, for "adajcent" read -- adjacent --; line 58, for "are out of mesh and out of contact with the teeth" read -- at a plurality of circumferentially spaced points --; line 60, for "wtih" read -- with --; same column 8, line 73, for the claim reference numeral "1" read -- 11 --.

(SEAL)        Signed and sealed this 14th day of September 1965.

Attest:

ERNEST W. SWIDER
Attesting Officer

EDWARD J. BRENNER
Commissioner of Patents